United States Patent [19]
Kunz et al.

[11] Patent Number: 5,170,855
[45] Date of Patent: Dec. 15, 1992

[54] DRAFT PROTECTION DEVICE FOR A PRECISION BALANCE

[75] Inventors: Peter Kunz, Gossau; Tadeusz Wojnarski, Wallisellen, both of Switzerland

[73] Assignee: Mettler-Toldedo AG, Greifensee, Switzerland

[21] Appl. No.: 781,775

[22] Filed: Oct. 23, 1991

[30] Foreign Application Priority Data

Feb. 1, 1991 [CA] Canada .................................. 322/91

[51] Int. Cl.⁵ ...................... G01G 23/18; G01G 21/28
[52] U.S. Cl. ..................................... 177/181; 177/238
[58] Field of Search ................................ 177/180–182, 177/238

[56] References Cited

U.S. PATENT DOCUMENTS

| 4,465,152 | 8/1984 | Schmitter | 177/180 |
| 4,664,207 | 5/1987 | Knothe et al. | 177/181 |
| 4,666,005 | 5/1987 | Komoto et al. | 177/180 |
| 4,700,793 | 10/1987 | Luchinger | 177/181 |
| 4,789,034 | 12/1988 | Luchinger et al. | 177/181 |
| 5,058,692 | 10/1991 | Melcher et al. | 177/181 |

Primary Examiner—George H. Miller, Jr.
Attorney, Agent, or Firm—Anderson Kill Olick & Oshinsky

[57] ABSTRACT

A draft protection device for a precision balance includes a base and a stationary rear wall connected to the base. The top of a front pane is connected through two connecting bars to the rear wall. The draft protection device further includes two sliding doors which are slidably mounted in longitudinal guides in the connecting bars and in the base. Racks are mounted in the areas of the upper edge and of the lower edge of at least one of the sliding doors. Pinions connected to each other through a vertically extending shaft mounted at the rear wall mesh with the racks. The shaft may be driven by an electric drive.

13 Claims, 3 Drawing Sheets

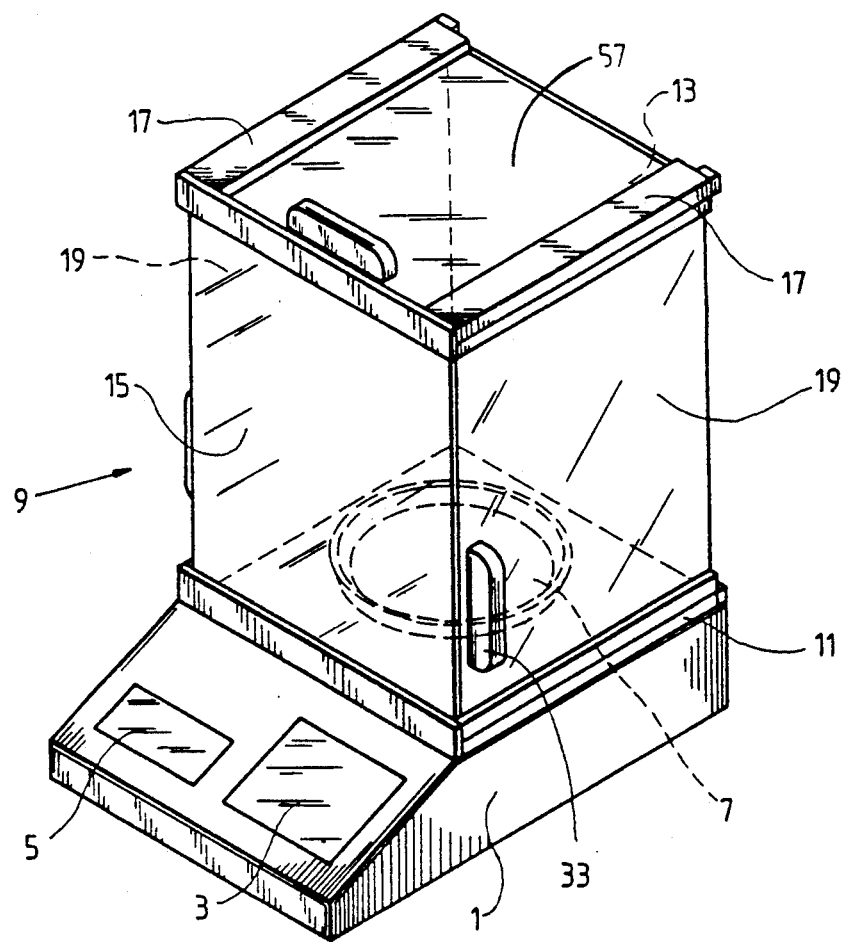

DRAFT PROTECTION DEVICE FOR A PRECISION BALANCE

BACKGROUND OF THE INVENTION

1. Field of the Invention

The present invention relates to a draft protection device or wind screen for a precision balance. The draft protection device includes a base and a stationary rear wall connected to the base and a front pane whose top is connected by means of two connecting bars to the rear wall. The draft protection device further includes two sliding doors which form side walls and are slidably mounted in longitudinal guide means in the connecting bars and in the base.

2. Description of the Related Art

Draft protection devices of the above-described type are known in the art. These devices have the purpose to prevent falsifications of the weighing results due to air flows.

EP 234008 discloses a precision balance with a weighing space which surrounds the weighing dish on all sides. The weighing space is formed by a stationary front pane and a sliding door on each side which can be moved rearwardly. In this known precision balance, the weighing mechanism and the electronic system are mounted in a housing behind the weighing space, i.e., behind the rear wall forming the weighing space. The housing is capable of completely receiving and guiding the sliding doors in the rearwardly moved position. Rails supporting the side door are provided in the base of the balance and at the upper side of the balance. The rails extend from the front end to the rearward wall of the balance housing and facilitate a precise guidance of the door along the entire sliding distance. An electric drive for sliding the sliding door acts on a plate which is rearwardly movable together with the doors and which is arranged underneath the bottom wall of the balance. This configuration ensures a problem-free operation.

If the weighing space formed by the sliding doors on the sides, by the rear wall, by the front pane and by an upper cover is placed on a balance with an upper weighing dish with the weighing mechanism being completely received in the base of the balance, the sliding doors are not guided in the area behind the rear wall of the weighing space. An example of such a balance is known from German patent 35 08 873. When the sliding doors on the sides are pushed rearwardly, the lower edges and upper edges of the side walls leave the guide means provided on the draft protection device and are moved completely unguided in a cantilevering manner into the free space behind the balance. The portion of the sliding doors remaining in the guide means is very short, so that the weight of the door, on the one hand, and any force applied for displacement of the door which is not introduced in the center thereof, on the other hand, have the result that the door is tilted rearwardly and, consequently, is canted in the guide means. In order to provide a longer length for the guide means, it is possible, for example, as shown in German patent 35 08 853, to provide a guide rail which projects beyond the rear wall of the balance. However, such a configuration is not only optically unsatisfactory but also practically, and only partially solves the problem.

In addition, U.S. Pat. No. 1,784,098 describes a draft protection device for a precision balance in which the front pane is slidable without lateral guide means toward the top beyond the upper cover of the weighing space. For this purpose, the front pane is longitudinally guided in a very stiff frame which is connected to the side walls and is held in the raised position thereof by means of a counterweight which is connected to the front pane through two belts which travel around two rollers and act on the lower edge of the front pane. In such a balance, if the front pane is not held exactly in the middle at the grip thereof and is moved upwardly in this manner, the pane can cant within the lateral guide means with increasing lifting height.

SUMMARY OF THE INVENTION

Therefore, it is the object of the present invention to provide a draft protection device in which the sliding doors are exactly guided in all positions thereof and are held without canting when they are pushed rearwardly beyond the rear wall of the draft protection device.

In accordance with the present invention, a draft protection device of the type described above includes coupling means mounted in the area of the upper edge and in the area of the lower edge of the sliding door and transmission means for kinematically connecting the coupling means.

For example, the transmission means may be gear drives or rope or belt drives or combinations thereof.

In accordance with a feature of the invention, racks are fastened to the upper edge and the lower edge of each sliding door. Pinions which are connected so as to rotate together mesh with the racks and, thus, ensure an exactly synchronous movement of the doors at the upper and lower sides thereof, so that canting of the doors in the guide rails cannot occur at any time. The use of pinions mounted on a common shaft makes the transmission inexpensive to manufacture and requires little space. The shaft connecting the pinions can be mounted in a simple manner in the base and the upper cover of the weighing space or at the rear wall thereof.

The racks can be glued directly to the sliding doors which are usually made of glass. However, if the sliding doors have sectional profiles at the top and bottom thereof, the racks may also be a component of these sectional profiles. When the pinions are elastically pretensioned, the pinions rest without play against the racks. The pinions can be pretensioned in a simple manner by bending the shaft carrying the pinions before the sliding doors are slid into the guide means. After the door has been slid into the initial position, the elastic shaft returns by itself into the extended shape.

If the racks are arranged in such a way that the teeth thereof face toward each other, the pinions meshing with the racks can be connected in a frictionally engaging manner simply and inexpensively by means of a cross rope drive or belt drive.

If an electric drive is used for the doors, this drive can advantageously be connected directly to the transmission means, i.e., the shaft or the belt drive. This ensures that the movement of the sliding door takes place synchronously at the upper edge and at the lower edge of the door.

If electrically conductive materials are used, the physical connection between the draft protection device housing and the sliding doors provides an excellent electric contact of the two components, so that any electrostatic charge of the doors which may occur and which would influence the weighing results is discharged.

The various features of novelty which characterize the invention are pointed out with particularity in the claims annexedosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 1 is a perspective view of a precision balance with a draft protection device mounted thereon;

FIG. 2 is a side view of the balance of FIG. 1 with a rearwardly slid door shown in dash-dot lines;

DESCRIPTION OF THE PREFERRED EMBODIMENTS

Figure 3:
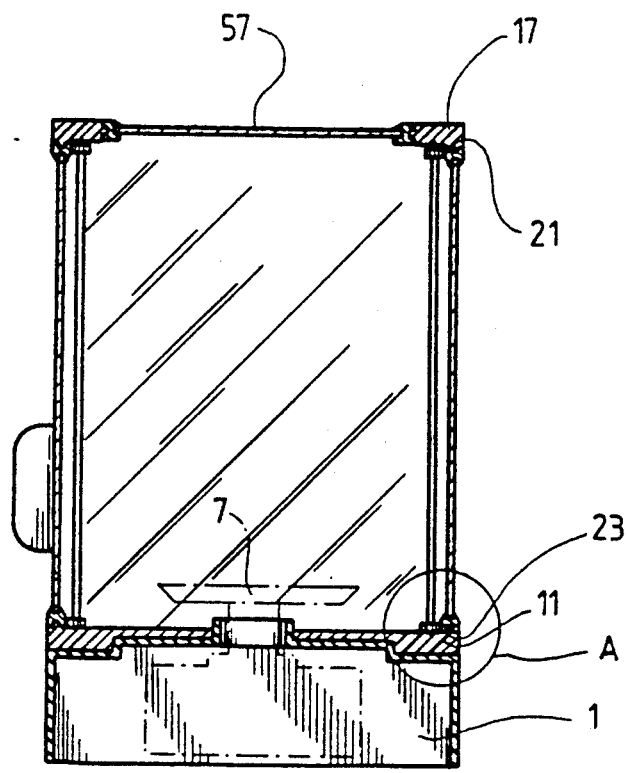
FIG. 3 is a cross-sectional view taken along sectional line II—II of FIG. 2.

As shown in FIG. 1 of the drawing, a cubic draft protection device 9 is placed on a balance housing denoted by reference numeral 1. The balance housing includes a display area 3 and a key area 5 and a weighing dish 7. The draft protection device 9 essentially includes a base 11 and a rear wall 13 which is rigidly connected to the base 11. A front pane 15 connects the base 11 with two connecting bars 17 which extend forwardly from the rear wall 13. The draft protection device 9 further includes two sliding doors 19 which laterally close off the draft protection device 9.

In the side view of FIG. 2, the sliding door 19 shown in dash-dot lines is completely moved out, i.e., moved toward the rear. The sliding door 19 projects almost completely beyond the rear wall 13 in a cantilevering manner, i.e., without guiding elements. Only the two short portions in the area s are still supported by the upper guide track 21 in the connecting bar 17 and the lower guide track 23 in the base 11 (see FIG. 3).

Figure 5:
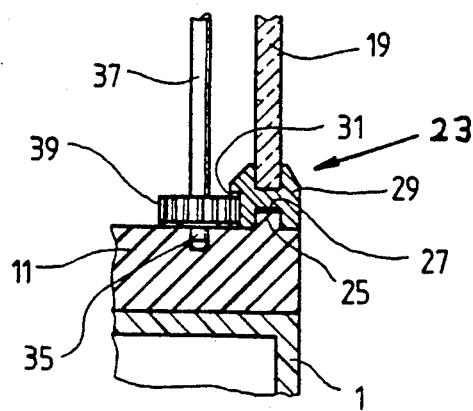
FIG. 5 shows a detail of the area designated A in FIG. 3

As particularly shown in FIG. 5, the guide tracks 21 (not visible) and 23 in the connecting bar 17 and the base 11, respectively, include a projecting rib 25 which engages in a groove 27 in the sliding doors 19. The grooves 27 may be provided directly in the sliding door 19 which is made of glass or plastic. However, for reasons of simpler manufacture, it is preferred if the grooves 27 are provided in a sectional profile 29 provided at the top edge and the bottom edge of the sliding door 19, respectively.

A rack 31 each is arranged on the sides of the profiles 29 facing the weighing space. The rack 31 can be glued or screwed to the sectional profile 29. However, the rack 31 can also be a structural component of the sectional profile 29, particularly if the latter is of plastic material. The teeth or toothings of the rack 31 are directed toward the interior of the weighing space 9. The ribs 25 on the base 11 and in the connecting bars 17 extend essentially over the entire length of the draft protection device 9 and end at the rear wall 13. A grip 33 is provided at each sliding door 19 to facilitate opening thereof (see e.g. FIG. 1).

A bore 35 each is provided in the base 11 and in the connecting bar 17 or at the upper edge of the rear wall 13. The bore 35 receives the ends of a shaft 37 which extends over the entire height of the draft protection device. Two pinions 39 which mesh with the racks 31 on the driving door 19 are mounted on the shaft 37. Instead of supporting the shafts 37 at the ends thereof, it is also possible to provide bearing blocks 41 at the rear wall 13. As schematically illustrated in FIG. 2, the pinions 39 are connected to the shaft 37 so as to rotate therewith.

Figure 6:
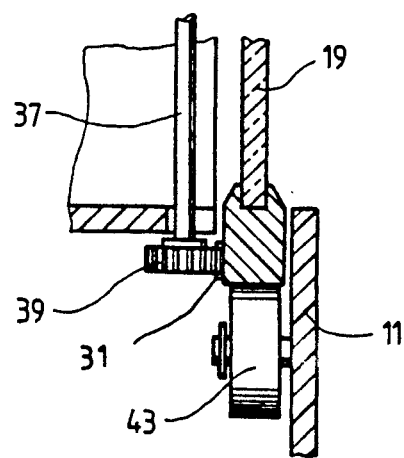
FIG. 6 shows a detail of the area A of FIG. 3 in another embodiment.

Instead of a rib 25 arranged on the base, as shown in FIG. 5, it is also possible in accordance with the present invention to construct the lower sectional profile 29 in such a way that it rests on rollers 43 on the base 11 (FIG. 6).

Figure 7:
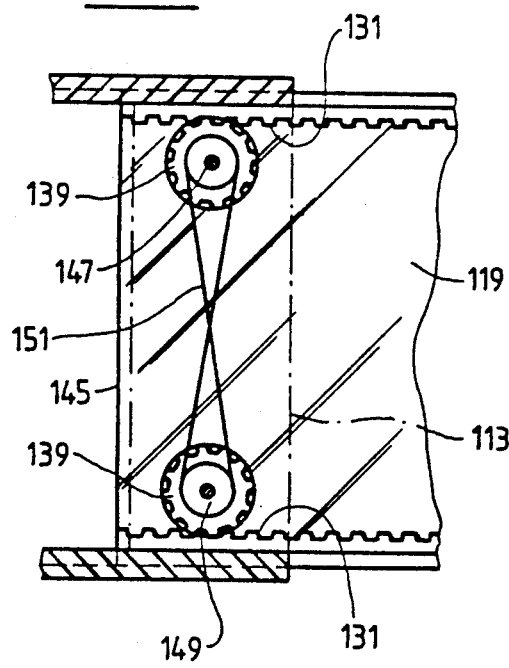
FIG. 7 is a schematic illustration of the transmission means in the form of a rope drive.

In accordance with another development of the invention shown in FIG. 7, the two racks 131 are mounted on the sliding door 119 in such a way that the toothings thereof face each other. The pinions 139 are freely rotatably mounted on shaft stubs 147 on portions 145 of the rear wall 113 which extend parallel to the sliding doors 119. A belt pulley 149 each is connected to the pinions 139 so as to rotate therewith. A flat or toothed belt 151 is placed in a crossed manner over the two belt pulleys 149 and synchronously connects the two pinions 139.

Figure 8:
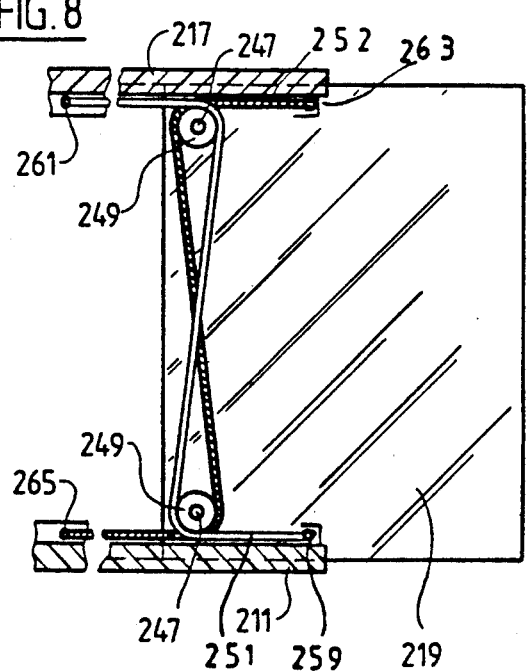
FIG. 8 is a schematic illustration of the transmission means in an other embodiment of the invention.

In the embodiment of the invention shown in FIG. 8, two ropes or belts 251 and 252 are provided for each sliding door 219. Both ropes are connected with the ends thereof at fastening points 259, 261 and 263, 265 to the connecting bar 217 and the base 211, respectively. Two freely rotatable rollers or belt pulleys 249 each are mounted on shaft stubs 247 on the sliding doors 219.

The rope 251 extends from its fastening point 259 on the base 211 over the lower roller 249 to the upper roller and is deflected by the upper roller in the direction toward the front side at the draft protection device and is fastened on the front side of the fastening point 261 to the front end of the connecting bar 217. Similarly, the rope 252 extends from the rear edge of the connecting bar 217, i.e., the fastening point 263, over the upper roller 249 towards the lower roller and is deflected by the lower roller toward the front and is fastened with its end at the fastening point 265 to the base 211.

Because of the oppositely symmetrical arrangement of the two ropes 251 and 252, the upper edge and the lower edge of the sliding door 219 are always positively guided in parallel directions and, thus, cannot assume an oblique position in the guide means.

Figure 4:
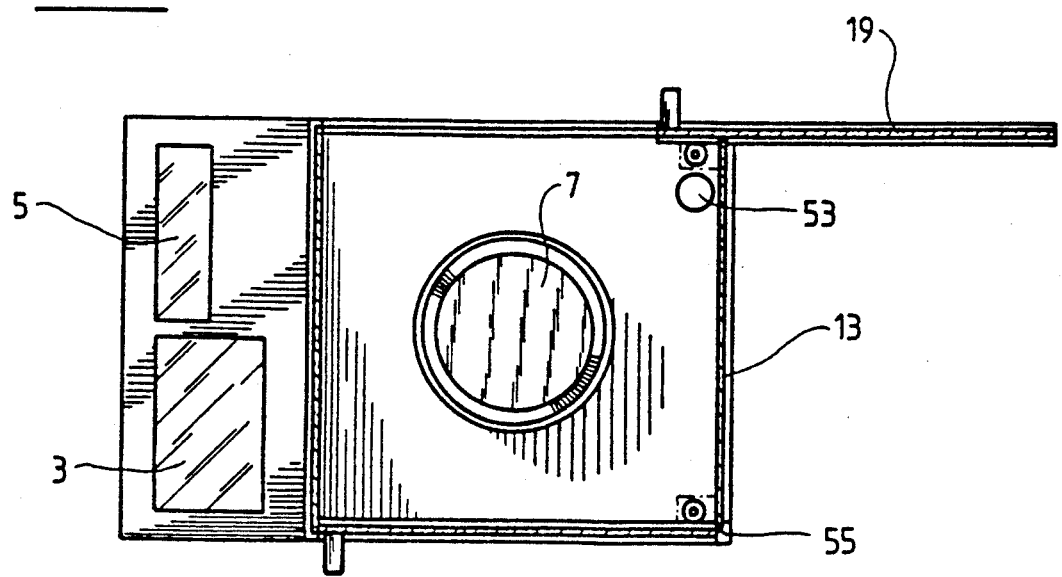
FIG. 4 is a horizontal sectional view taken along sectional line IV—IV of FIG. 2.

If an electrical drive is desired for moving the sliding doors 19, 119, a drive motor 53 or a pinion mounted on the drive shaft of the motor can be connected so as to directly mesh with one of the pinions 39, 139 which are already provided, as schematically illustrated in FIG. 4.

The physical connection between the sliding doors 19 with the base 11 or the balance housing 9 over the meshing racks 31 and pinions 39 can also be used for discharging electrostatic charges from the sliding door 19, 119. For this purpose, the racks 31, 131 and the pinions 39, 139 can be manufactured from an electrically conductive material. As an alternative or additionally, a brush-type seal 55 mounted on the rear wall 13, 113, as shown in FIG. 4, may be of an electrically conductive material.

Of course, a horizontally extending sliding door 57, which is shown in FIG. 1 and forms the upper cover of the draft protection device 9 and is supported on the connecting bars 17, can also be guided in the above-described manner.

While specific embodiments of the invention have been shown and described in detail to illustrate the inventive principles, it will be understood that the invention may be embodied otherwise without departing from such principles.

We claim:

1. In a draft protection device for a precision balance, the draft protection device including a base and a stationary rear wall connected to the base, a front pane having a top, the top of the front pane being connected by means of connecting bars to the rear wall, the draft protection device further including two sliding doors which form side walls, each sliding door having an upper edge and a lower edge, longitudinal guide means being provided in the connecting bars and in the base, the sliding doors being slidably mounted in the longitudinal guide means in the connecting bars and in the base, the improvement comprising coupling means mounted at the upper edge and at the lower edge of at least one of the sliding doors and transmission means for kinematically connecting the coupling means.

2. The draft protection device according to claim 1, comprising two flexible tension elements having ends, the ends being fastened to the connecting bars and the base, the tension elements being guided in a crosswise manner over a first roller at the upper edge of the sliding door to a second roller at the lower edge of the sliding door and being guided from the lower edge of the sliding door to the base and being fastened to the base.

3. The draft protection device according to claim 1, comprising an electric drive connected to the transmission unit.

4. The draft protection device according to claim 1, comprising elastic sealing means of electrically conductive material mounted between the rear wall and the sliding doors.

5. The draft protection device according to claim 1, wherein the coupling means are racks and the transmission means are two pinions, wherein each pinion meshes with one of the racks, and wherein the two pinions are connected to each other so as to be driven together.

6. The draft protection device according to claim 5, wherein the racks and pinions are of electrically conductive material.

7. The draft protection device according to claim 5, the two racks having toothings, the racks being fastened to the upper edge and to the lower edge of the sliding door such that the toothings are directed toward each other, the pinions being rotatably mounted about axes which extend perpendicularly to a sliding plane of the sliding door, wherein the pinions are connected to each other in a frictionally engaging manner by means of a rope drive or belt drive.

8. The draft protection device according to claim 5, comprising spring force means for pressing the pinions without play against the racks.

9. The draft protection device according to claim 8, wherein the spring force means are produced by bending of the shaft in direction of the sliding door.

10. The draft protection device according to claim 5, wherein each rack has a toothing and a side facing away from the toothing, and wherein the sliding doors each have an inner surface, the racks being fastened with the side facing away from the toothing to the inner surfaces of the sliding doors, the pinions being mounted on a common shaft, the common shaft being rotatably mounted in the base and in the connecting bar.

11. The draft protection device according to claim 5, wherein each rack has a toothing and a side facing away from the toothing, and wherein the sliding doors each have an inner surface, the racks being fastened with the side facing away from the toothing to the inner surfaces of the sliding doors, the pinions being mounted on a common shaft, the common shaft being rotatably mounted in bearing blocks attached to the rear wall.

12. The draft protection device according to claim 10 or 11, comprising sectional profiles attached to the upper edge and the lower edge of each sliding door, the racks being fastened to the sectional profiles.

13. The draft protection device according to claim 10 or 11, comprising sectional profiles attached to the upper edge and the lower edge of each sliding door, the sectional profiles each having a toothed surface forming the racks.

* * * * *

UNITED STATES PATENT AND TRADEMARK OFFICE
CERTIFICATE OF CORRECTION

PATENT NO. : 5,170,855
DATED : 15 December 1992
INVENTOR(S) : Peter Kunz, et al.

It is certified that error appears in the above-indentified patent and that said Letters Patent is hereby corrected as shown below:

On the title page,

(30) Foreign Application Priority Data

Feb. 1, 1991 (CH) Switzerland ......322/91

Signed and Sealed this

Twelfth Day of October, 1993

Attest:

BRUCE LEHMAN

*Attesting Officer*            *Commissioner of Patents and Trademarks*